United States Patent
Kim et al.

(10) Patent No.: US 12,366,546 B2
(45) Date of Patent: Jul. 22, 2025

(54) FILTER CONTAMINATION MEASURING DEVICE, FILTER ASSEMBLY INCLUDING THE SAME, AND FILTER CONTAMINATION MEASURING METHOD USING THE SAME

(71) Applicant: SAMSUNG ELECTRONICS CO., LTD., Suwon-si (KR)

(72) Inventors: Yunho Kim, Yongin-si (KR); Jinhyeok Jang, Suwon-si (KR); Hyunwoo Kim, Yongin-si (KR); Jaeeun Song, Hwaseong-si (KR); Seokjun Won, Seoul (KR); Yigil Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 426 days.

(21) Appl. No.: 17/935,131

(22) Filed: Sep. 25, 2022

(65) Prior Publication Data

US 2023/0194456 A1 Jun. 22, 2023

(30) Foreign Application Priority Data

Dec. 21, 2021 (KR) .................. 10-2021-0183438

(51) Int. Cl.
*G01N 27/49* (2006.01)
*B01D 35/06* (2006.01)
(Continued)

(52) U.S. Cl.
CPC .......... *G01N 27/301* (2013.01); *B01D 35/06* (2013.01); *G01N 27/4161* (2013.01); *G01N 27/49* (2013.01); *C25B 15/00* (2013.01)

(58) Field of Classification Search
CPC .. G01N 27/301; G01N 27/4161; G01N 27/49; C25B 15/00; C25B 15/02;
(Continued)

(56) References Cited

U.S. PATENT DOCUMENTS 4,183,029 A * 1/1980 Isayama ............... B01D 35/143
347/93
4,952,386 A * 8/1990 Davison .................. C01B 7/195
210/915

(Continued)

FOREIGN PATENT DOCUMENTS

CN 108808016 11/2016
CN 106841334 6/2017
(Continued)

OTHER PUBLICATIONS

Kyong Wone Kim, et al. "Differential Pulse Voltammetric Determination of Iron(II) ion with a Nafion-Ethylenediamine Modified Glassy Carbon Electrode", Journal of the Korean Chemical Society 2003, vol. 47, No. 2.

(Continued)

*Primary Examiner* — Alexander S Noguerola
(74) *Attorney, Agent, or Firm* — MORGAN, LEWIS & BOCKIUS LLP

(57) ABSTRACT

A filter contamination measuring device includes: a working electrode adjacent to a first surface of a filter, the filter configured to adsorb an ionic material of a first polarity, a counter electrode disposed on the other surface of the filter, a potentiostat configured to apply a voltage of a second polarity to the working electrode for a predetermined period of time, and to measure current output from the working electrode. The potentiostat is configured to increase the voltage over the predetermined amount of time. The filter contamination measuring device further includes a controller configured to calculate a maximum current attained during the predetermined amount of time and a corresponding voltage value, and to determine the type and concentration of the ionic material based on the maximum current and the voltage value.

20 Claims, 11 Drawing Sheets

(51) Int. Cl.
*G01N 27/30* (2006.01)
*G01N 27/416* (2006.01)
*C25B 15/00* (2006.01)

(58) Field of Classification Search
CPC ......... C25B 15/023; C02F 2201/46115; C02F 2201/46125; C02F 2201/46135; C02F 2201/4614; B01D 2313/70; B01D 2313/701; B01D 2313/90; B01D 2313/903; B01D 2321/22; B01D 24/46; B01D 29/62; B01D 35/06; B01D 35/16
See application file for complete search history.

(56) References Cited

U.S. PATENT DOCUMENTS

| | | |
|---|---|---|
| 10,766,796 B2 | 9/2020 | Su et al. |
| 2014/0367277 A1 | 12/2014 | Crawford et al. |
| 2015/0300972 A1* | 10/2015 | Miyamura ........... G01N 27/301 |
| | | 204/400 |
| 2016/0061775 A1 | 3/2016 | Zabetakis et al. |
| 2021/0118587 A1 | 4/2021 | Bae et al. |

FOREIGN PATENT DOCUMENTS

| | | |
|---|---|---|
| KR | 10-2012-0103911 | 9/2012 |
| KR | 10-2021-0044717 | 4/2021 |

OTHER PUBLICATIONS

Hong-Joo Lee, et al. "Analysis of fouling potential in the electrodialysis process in the presence of an anionic surfactant foulant", Journal of Membrane Science 325 (2008) 719-726.

Jae-Hwan Choi, et al. "Heterogeneity of Ion-Exchange Membranes: The Effects of Membrane Transport Properties", Journal of Colloid and Interface Science 241, 120-126 (2001).

* cited by examiner

FILTER CONTAMINATION MEASURING DEVICE, FILTER ASSEMBLY INCLUDING THE SAME, AND FILTER CONTAMINATION MEASURING METHOD USING THE SAME

CROSS-REFERENCE TO RELATED APPLICATION(S)

This application claims priority under 35 USC § 119 to Korean Patent Application No. 10-2021-0183438, filed on Dec. 21, 2021 in the Korean Intellectual Property Office, the disclosure of which is incorporated by reference herein in its entirety.

TECHNICAL FIELD

The present inventive concept relates to a filter contamination measuring device, a filter assembly including the same and a filter contamination measuring method using the same.

DISCUSSION OF THE RELATED ART

Recently, semiconductor devices have been manufactured with increased integration and utilization of space. Highly integrated devices include small circuits disposed close together, and accordingly, these circuits have fine line width and pitch. In such cases, it is important for the chemical solutions used in the manufacturing process of the semiconductor devices to be clean and effectively free from contaminants.

Before manufacturing the semiconductor devices, the chemical solutions to be used are filtered through a filter with a small pore size. However, there can be very small particles in the chemical solution, and it may be difficult to determine the degree of adsorption (i.e., contamination) of the filter. Therefore, there is a need for a method to accurately measure an amount of fine particles adsorbed on the filter to ensure performant filtering over time.

SUMMARY

A filter contamination measuring device includes: a working electrode disposed adjacent to a first surface of a filter, the filter configured to adsorb an ionic material of a first polarity; a counter electrode disposed adjacent to a second surface of the filter, the second surface opposite to the first surface; a potentiostat configured to apply a voltage of a second polarity, that is opposite to the first polarity, to the working electrode for a predetermined period of time, and to measure current output from the working electrode during the predetermined period of time; and a controller configured to: calculate a maximum value of the current obtained during the predetermined period of time based on current measured by the potentiostat, calculate a value of the voltage applied by the potentiostat at the maximum value of the current, calculate the type and concentration of the ionic material from the voltage value, and compare the type and concentration of the ionic material with a reference value to determine whether the filter is contaminated, wherein the potentiostat linearly increases the voltage applied to the working electrode during the predetermined period of time.

A filter assembly includes: a housing having an inlet through which a fluid containing an ionic material of a first polarity is introduced and an outlet through which the fluid is discharged; a filter installed between the inlet and the outlet in the housing configured to remove the ionic material; a working electrode and a counter electrode respectively disposed on the front surface and rear surface of the filter; a potentiostat configured to apply a voltage of a second polarity, opposite to the first polarity, to the working electrode, and to measure current output from the working electrode over a predetermined period of time; and a controller configured to: calculate a maximum value of the current obtained during the predetermined period of time, based on the current measured by the potentiostat, calculate a value of the voltage applied by the potentiostat at a point in time corresponding to the maximum value of the current, calculate the type and concentration of the ionic material from the voltage value, and compare the type and concentration of the ionic material with one or more reference values to determine whether the filter is contaminated, wherein the potentiostat increases the voltage applied to the working electrode for the predetermined period of time.

A filter contamination measuring method includes: applying a voltage of a second polarity, opposite to a first polarity, to a working electrode disposed adjacent to a first surface of a filter, wherein the filter is configured to adsorb an ionic material of the first polarity; increasing the voltage over a predetermined amount of time using a potentiostat, and measuring a resultant current output from the working electrode; calculating a change curve of the current, which includes values of the current arranged over time; detecting a peak in the change curve of the current, and calculating a maximum value of the current at the peak; calculating a value of the voltage applied by the potentiostat at the detected maximum value of the current; calculating a type of the ionic material adsorbed on the filter from the voltage value, and calculating a concentration of the ionic material adsorbed on the filter from the maximum value of the current; and comparing the calculated concentration of the ionic material with one or more pre-stored reference values to determine whether the filter is contaminated.

BRIEF DESCRIPTION OF DRAWINGS

The above and other aspects and features of the present inventive concept will be more clearly understood from the following detailed description, taken in conjunction with the accompanying drawings, in which.

DETAILED DESCRIPTION

Hereinafter, example embodiments will be described with reference to the accompanying drawings. The inventive concept may be embodied in different forms, and is not necessarily limited to the embodiments set forth herein. The same reference numbers may indicate the same components throughout the specification, and to the extent that a description of an element has been omitted, it may be understood that the element is at least similar to corresponding elements that are described elsewhere in the specification.

Figure 1:
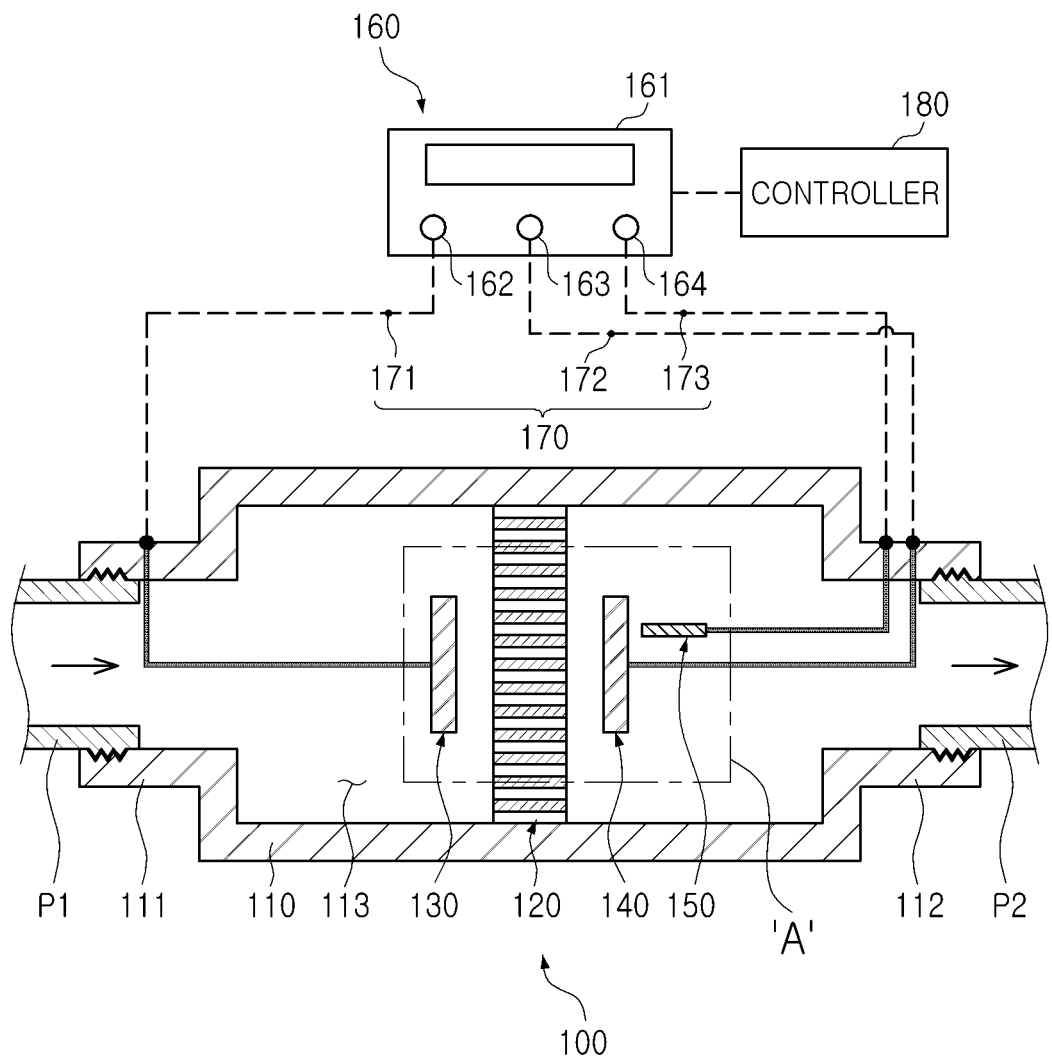
FIG. 1 is a view that schematically illustrates a filter assembly according to an example embodiment of the present inventive concept.
Figure 2A:
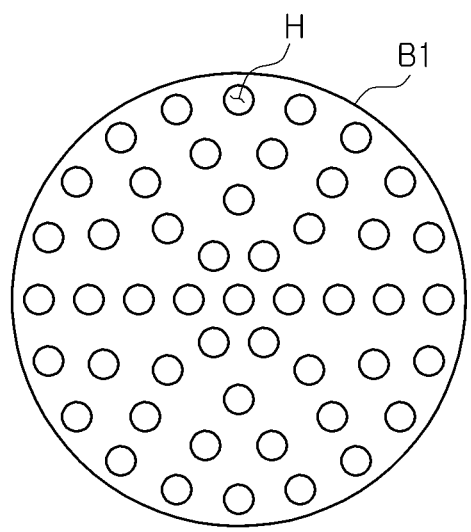
FIGS. 2A and 2B are plan views that schematically illustrate electrode plates included in the working electrode and in the counter electrode of FIG. 1.
Figure 2B:
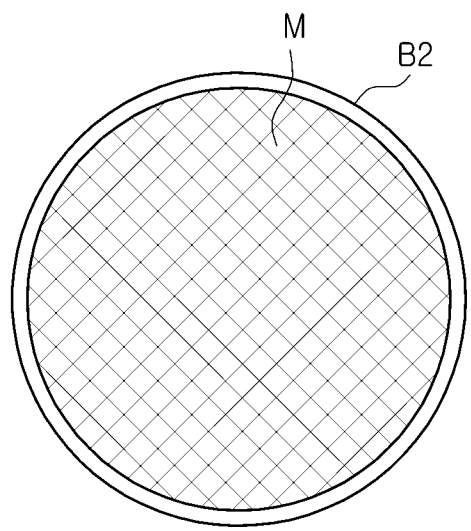
Figure 3:
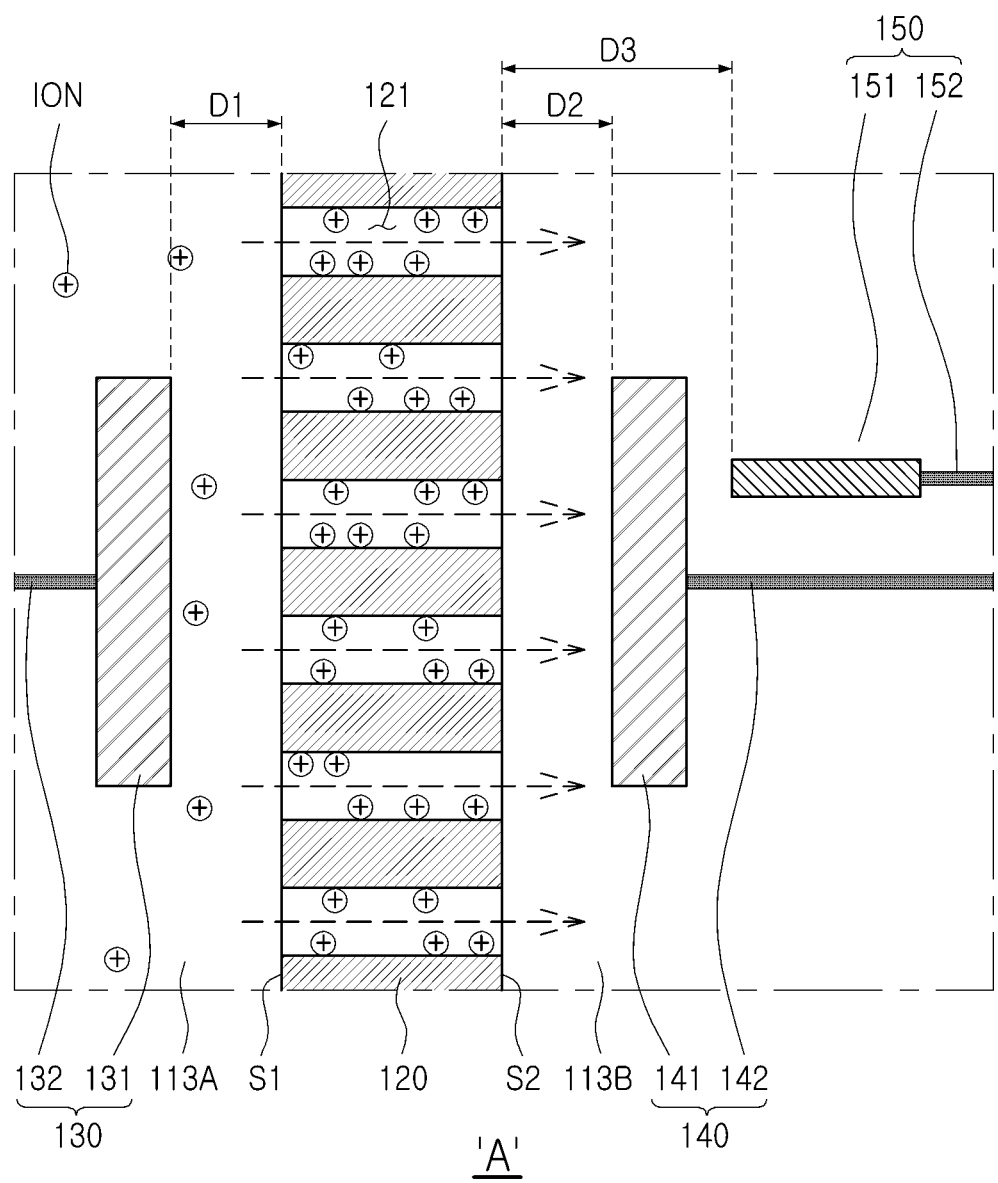
FIG. 3 is an enlarged view of a portion A of FIG. 1.

The following describes a filter assembly 100 according to an example embodiment with reference to FIGS. 1 through 3. FIG. 1 is a view that schematically illustrates the filter assembly according to an example embodiment of the present inventive concept; FIGS. 2A and 2B are plan views that schematically illustrate electrode plates included in the working electrode and in the counter electrode of FIG. 1; and FIG. 3 is an enlarged view of a portion A of FIG. 1.

Referring to FIGS. 1 and 3, the filter assembly 100 may include a housing 110, a filter 120, a working electrode 130, a counter electrode 140, a reference electrode 150, a potentiostat 160 and a controller 180. Components of the filter assembly 100 other than the housing 110 and the filter 120 may be understood as constituent components of a filter contamination measuring device for measuring contamination of the filter 120.

The housing 110 may form an appearance of the filter assembly 100, and may be formed in a shape of a cylinder having, for example, an inner space 113. An inlet 111 through which a fluid is introduced may be formed at one end of the housing 110, and an outlet 112 may be formed at the other end thereof. A first pipe P1, through which the fluid is provided, and a second pipe P2, through which the fluid is discharged, may respectively be connected to the inlet 111 and the outlet 112. The fluid supplied to the housing 110 may be a chemical solution used in a semiconductor manufacturing process, and may contain an ionic material ION, which may be undesired in the manufacturing process and considered an impurity. For example, the ionic material ION may be an iron ion $Fe^{2+}$ or a calcium ion $Ca^{2+}$, having a positive (+) polarity. As used herein, the phrase "positive polarity" means a positively charged ion with fewer electrons than protons (i.e., "cation") and the phrase "negative polarity" means a negatively charged ion with more electrons than protons (i.e., "anion").

The filter 120 may be disposed in the inner space 113 of the housing 110, and the inner space 113 may be divided into a front end and a rear end by the filter 120. The fluid introduced into the front end of the inner space 113 may be discharged to the rear end of the inner space 113 after the ionic material ION is adsorbed on the filter 120. For example, the filter 120 may be a membrane filter, and the ionic material ION may be adsorbed on a pore 121 of the filter 120.

The working electrode 130, the counter electrode 140 and the reference electrode 150 may be disposed in the inner space 113 of the housing 110. For example, the working electrode 130 may be disposed at the front end 113A of the inner space 113, and the counter electrode 140 and the reference electrode 150 may be disposed at the rear end of the inner space 113. In some embodiments, the reference electrode 150 may be omitted from the filter assembly 100. The working electrode 130, the counter electrode 140 and the reference electrode 150 may be connected to the potentiostat 160 and used to measure a concentration of the ionic material ION contained in the fluid.

The working electrode 130 may supply a site for a redox reaction of the ionic material ION whose concentration is to be measured to occur. The counter electrode 140 may facilitate a flow of a current, and the reference electrode 150 may provide a standard for controlling and measuring a potential of the working electrode 130. The working electrode 130, the counter electrode 140 and the reference electrode 150 may each be made of at least one of platinum (Pt), gold (Au), copper (Cu), palladium (Pd), nickel (Ni), and titanium (Ti), chromium (Cr), iron (Fe), cobalt (Co), aluminum (Al) and carbon (C), or alloys thereof. In some example embodiments, the working electrode 130 and the counter electrode 140 may be made of the same material, and the reference electrode 150 may be made of a different material from that of the working electrode 130 of the counter electrode 140. In one example, the working electrode 130 and the counter electrode 140 may be made of copper (Cu), silver (Ag) or iron (Fe), and the reference electrode 150 may be made of silver (Ag).

Referring to FIG. 3, the working electrode 130 may include a first electrode body 131 and a first connection electrode 132. The first electrode body 131 may be a region where the redox reaction of the ionic material ION occurs, and its shape may be modified according to different embodiments.

Referring to FIG. 2A, the first electrode body 131 may be formed of a circular plate B1, and a plurality of through-holes H through which the fluid flows may be formed in the circular plate B1. Referring to FIG. 2B, the first electrode body 131 may be formed in a circular ring B2, and a mesh M may be formed in the ring B2. However, the first electrode body 131 is not necessarily limited to these shapes, and may be formed into various shapes. Referring to FIG. 3, in an example embodiment, the first electrode body 131 may be spaced apart from a front surface S1 of the filter 120 by a first distance D1.

The first connection electrode 132 may electrically connect the first electrode body 131 to the housing 110, and support the first electrode body 131 so as to be maintained at a constant position in the inner space 113. A shape of the first connection electrode 132 may be variously modified based on the shape of the first electrode body 131.

The counter electrode 140 may include a second electrode body 141 and a second connection electrode 142. A shape of the second electrode body 141 and the second connection electrode 142 may be formed to correspond to the shape of the first electrode body 131 and the first connection electrode 132 described above. The counter electrode 140 may be variously shaped in the same manner as the working electrode 130. Referring to FIG. 3, in an example embodiment, the second electrode body 141 may be spaced apart from a rear surface S2 of the filter 120 by a second distance D2. In some example embodiments, the second distance D2 may be the same as the first distance D1.

The reference electrode 150 may include a third electrode body 151 and a third connection electrode 152. The third electrode body 151 may be formed into a bar shape. In an example embodiment, the third electrode body 151 may be spaced apart from the rear surface S2 of the filter 120 by a third distance D3. In some example embodiments, the third distance D3 may be greater than the second distance D2.

The potentiostat 160 may be connected to the working electrode 130 and the counter electrode 140, and may measure a value of a current flowing between the working electrode 130 and the counter electrode 140 based on the potential of the working electrode 130, while changing a voltage applied to the working electrode 130 for a predetermined period of time. For example, when the ionic material ION has the positive (+) polarity, the potentiostat 160 may apply the voltage so that the working electrode 130 has a potential value with a negative (−) polarity, and measure a value of a current output through the working electrode 130. For example, the predetermined period of time may include enough time such that at least one peak Pk occurs in a change curve of the current. The change curve may include measured values of the current that are arranged over time. For example, a range of the voltage applied by the potentiostat 160 may include the oxidation voltage value or reduction voltage value of the ionic material ION.

Referring to FIG. 1, the potentiostat 160 may be connected to the working electrode 130, the counter electrode 140 and the reference electrode 150 through a transmission member 170 such as a cable. The potentiostat 160 may include a body 161, a first port 162, a second port 163 and a third port 164. The first port 162, the second port 163 and the third port 164 may be respectively electrically connected to the working electrode 130, the counter electrode 140 and the reference electrode 150 through the first, second and third transmission members 171, 172 and 173.

Figure 7A:
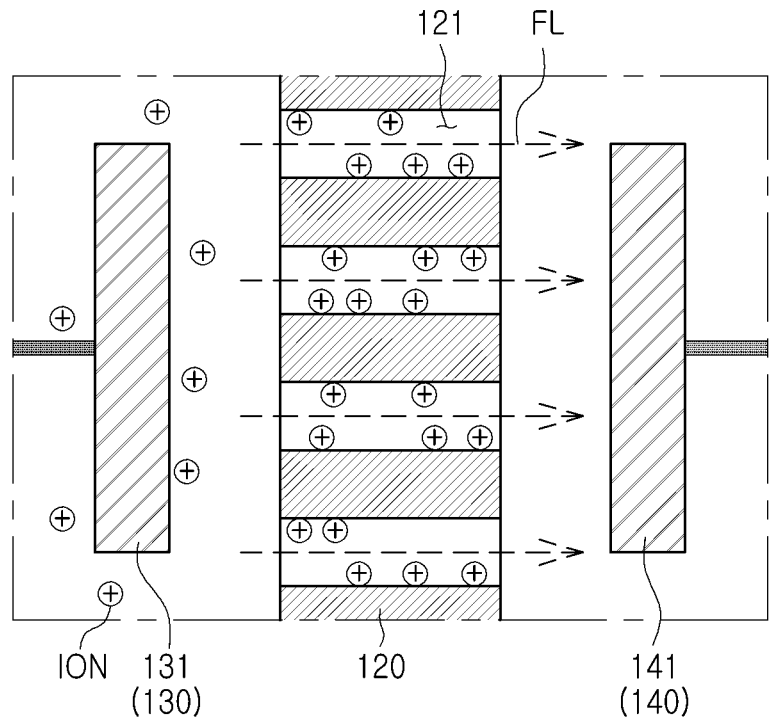
FIGS. 7A through 7E are views that schematically illustrate processes of measuring a concentration of an ionic material included in a chemical solution.
Figure 7B:
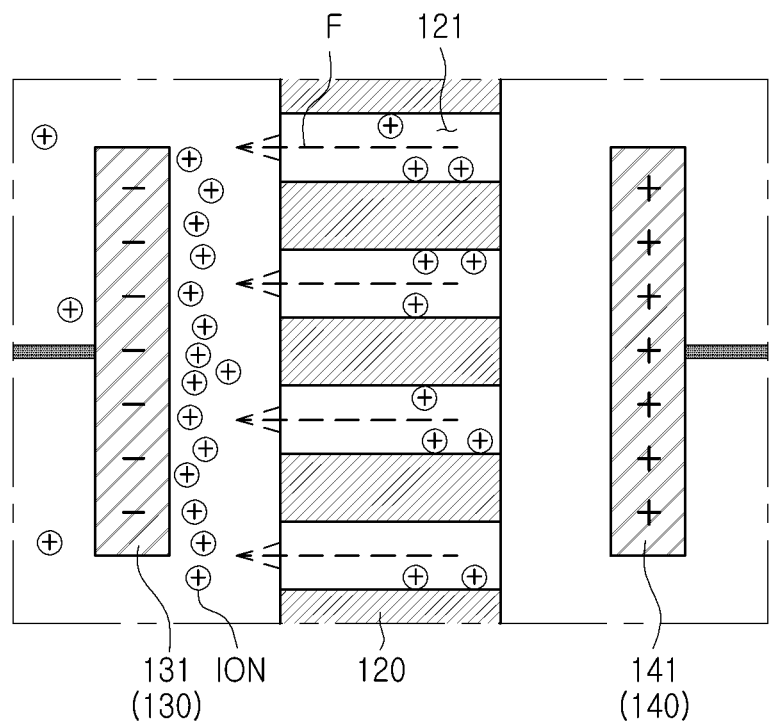
Figure 7C:
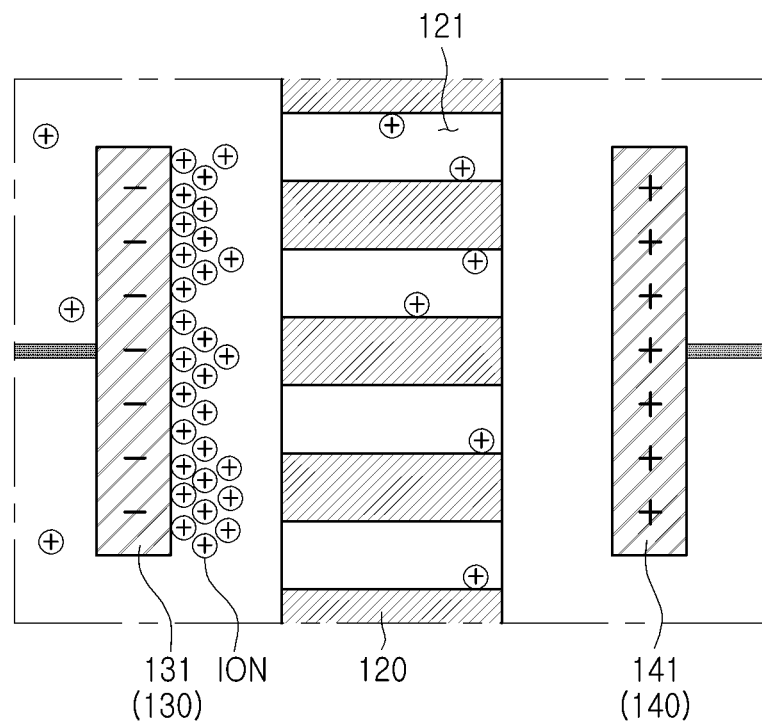
Figure 7D:
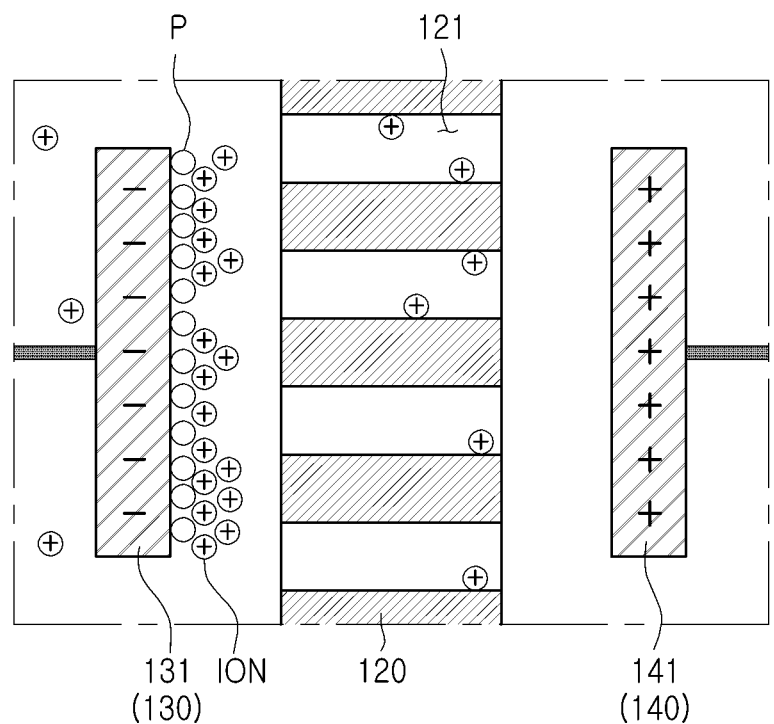
Figure 7E:
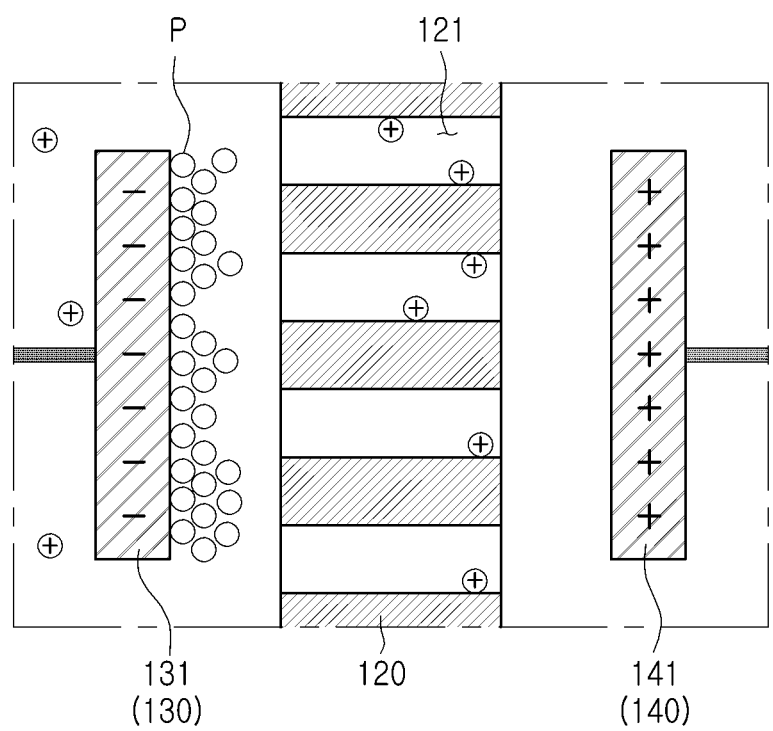
Figure 8A:
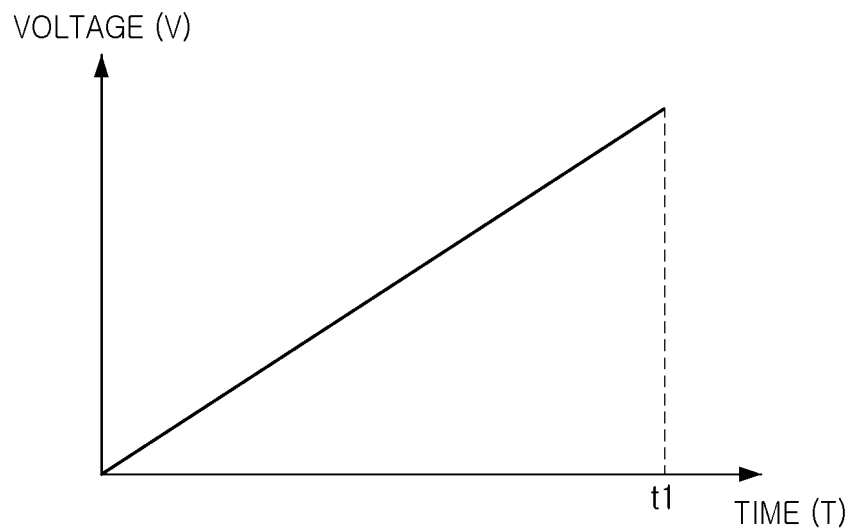
FIG. 8A is a view that illustrates a voltage applied to the working electrode.
Figure 8B:
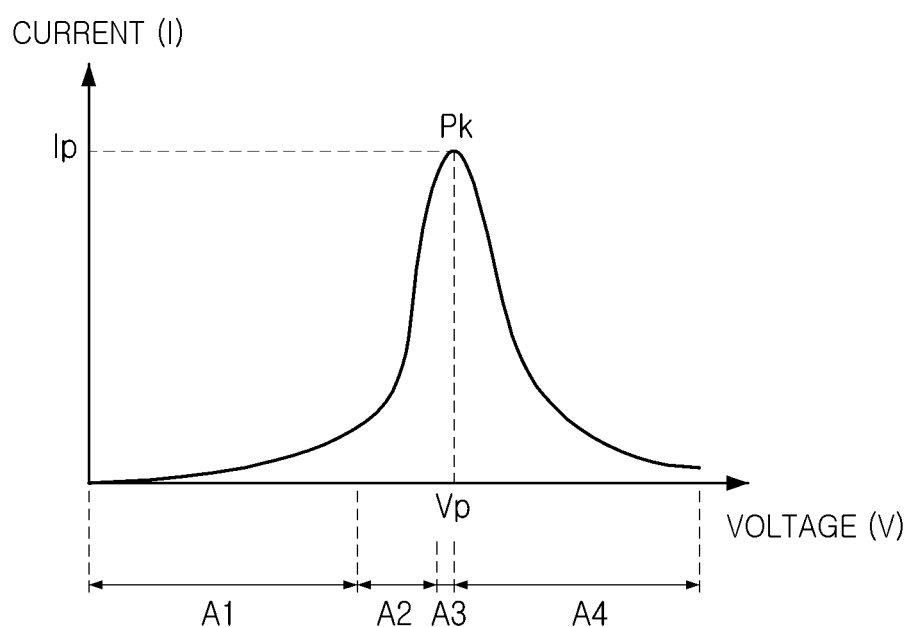
FIG. 8B is a view that illustrates a change curve of a current detected in the working electrode.

The following describes the voltage applied by the potentiostat 160 to the working electrode 130 and the value of the current output from the working electrode 130 with reference to FIGS. 7A through 7E, 8A, and 8B. FIGS. 7A through 7E are views that schematically illustrate processes of measuring the concentration of the ionic material included in the chemical solution; FIG. 8A is a view that illustrates the voltage applied to the working electrode; and FIG. 8B is a view that illustrates the change curve of the current detected in the working electrode.

FIG. 7A illustrates a state before the voltage is applied to the working electrode 130. In this example, the ionic material (ION) having the positive (+) polarity is adsorbed on the pore 121 of the filter 120 by a flow FL of the fluid flowing to the working electrode 130 through the filter 120.

FIG. 7B illustrates a state where the voltage has begun to be applied to the working electrode 130. A voltage of the negative (−) polarity may be applied to the working electrode 130, and a voltage of the positive (+) polarity may be applied to the counter electrode 140. Here, some of the ionic material (ION) having the positive (+) polarity which had been previously adsorbed on the pore 121 of the filter 120, may be moved to the working electrode 130 by electrical attraction F. Referring to FIG. 8A, the voltage applied by the potentiostat 160 to the working electrode 130 may be applied for a predetermined period of time t1 and may be linearly increased during t1. As shown in FIG. 8B, the current output from the working electrode 130 may gradually increase in a range A1.

FIG. 7C illustrates a state where the voltage, applied to the working electrode 130, is linearly increased. In this example, a higher voltage of the positive (+) polarity is applied to the counter electrode 140, and all of movable ionic materials ION of the ionic materials ION having the positive (+) polarity, which were adsorbed on the pore 121 of the filter 120, are moved to the working electrode 130. Referring to FIG. 8B, the current output from the working electrode 130 may here be rapidly increased in a range A2.

FIG. 7D also illustrates a state where the voltage applied to the working electrode 130 at a different point in time during the linear increase. It may be seen that some of the ionic materials ION adsorbed on the working electrode 130 may be reduced by electrons supplied from the working electrode 130 and precipitated as particles P as the voltage applied to the working electrode 130 is increased. Referring to FIG. 8B, the ionic material ION may be reduced in the working electrode 130, and the current output from the working electrode 130 may have a maximum value Ip in a range A3. For example, the change curve of the current output based on a voltage V applied to the working electrode 130 may have the peak Pk having the maximum value Ip. A voltage value Vp of the peak Pk may be based on a type of the ionic material ION to be reduced. For example, the voltage value Vp of the peak may be 0.5 V when the ionic material ION is the iron ion $Fe^{2+}$, and the voltage value Vp of the peak may be 0.9 V when the ionic material ION is the calcium ion $Ca^{2+}$. Therefore, the type of the ionic material ION may be identified by measuring the voltage value Vp of the peak. In addition, a concentration C of the ionic material ION may be calculated from the maximum value Ip of the current by using a Randles—Sevcik equation expressed in Equation 1 below. Equation 1 below is written based on a case in which the filter assembly 100 is operated in an environment of 25° C. and 1 atm.

$$I_p = (2.687 \times 10^5) \times n^{3/2} \times V^{1/2} \times D^{1/2} \times A \times C \text{[Equation 1]}$$

Ip: maximum value of current, n: number of electrons participating in oxidation/reduction reaction,
V: scan rate (V/sec), D: diffusion coefficient ($cm^2$/sec),
A: electrode area ($cm^2$), C: concentration (mol/$cm^3$)

Accordingly, the type and concentration of the ionic material ION adsorbed on the filter 120 may be calculated from the maximum value Ip of the current output from the working electrode 130 and the voltage value Vp at that time.

In at least one embodiment, the voltage applied to the working electrode 130 is varied non-linearly over time. For example, the voltage may be increased in stepped changes occurring at regular intervals, or may follow an exponential curve.

FIG. 7E illustrates a state where the voltage applied to the working electrode 130 is further increased than that of FIG. 7D; for example, past a voltage value of Vp. At this point, most of the ionic materials adsorbed on the working electrode 130 may be reduced and precipitated on a surface of the working electrode 130. This may prevent further positive ionic material ION from reaching the working electrode 130 in the short term. Accordingly, the current output from the working electrode 130 may be rapidly reduced in a range A4.

The controller 180 may calculate the change curve of the current, based on a value of a current output from the potentiostat 160, and may calculate the maximum value Ip of the current and the voltage value Vp from the peak of the change curve of the current. In addition, the controller 180 may calculate the type and concentration of the ionic material ION from the calculated maximum value Ip of the current and voltage value Vp, and compare the calculated concentration value with a pre-stored reference value to determine whether to replace the filter assembly 100. Some embodiments include multiple pre-stored reference values which correspond current values to concentrations, as well as values which correspond voltage values to types of ionic material. When the filter is required to be replaced, the controller 180 may notify a user by using text, an alarm or audiovisual members.

For example, the controller 180 may determine that the concentration of the ionic material ION is greater than the pre-stored reference value, and therefore determine that it is necessary to replace the filter assembly 100. Unlike measuring a filter's efficacy based on pressure drop over time, the system and method for measuring filter contamination according to the present embodiments allows for increased accuracy and precision in determining whether a filter needs replacement. Accordingly, a system implementing the filter assembly with the filter contamination measuring device as described herein may have increased reliability.

The controller 180 may be implemented as a processor such as a central processing unit (CPU), a graphic processing unit (GPU), a microprocessor, an application specific integrated circuit (ASIC), a field programmable gate arrays (FPGA) or the like. In addition, the controller 180 may include a memory storing various data necessary to calculate the maximum value Ip of the current and the voltage value Vp.

Figure 4:
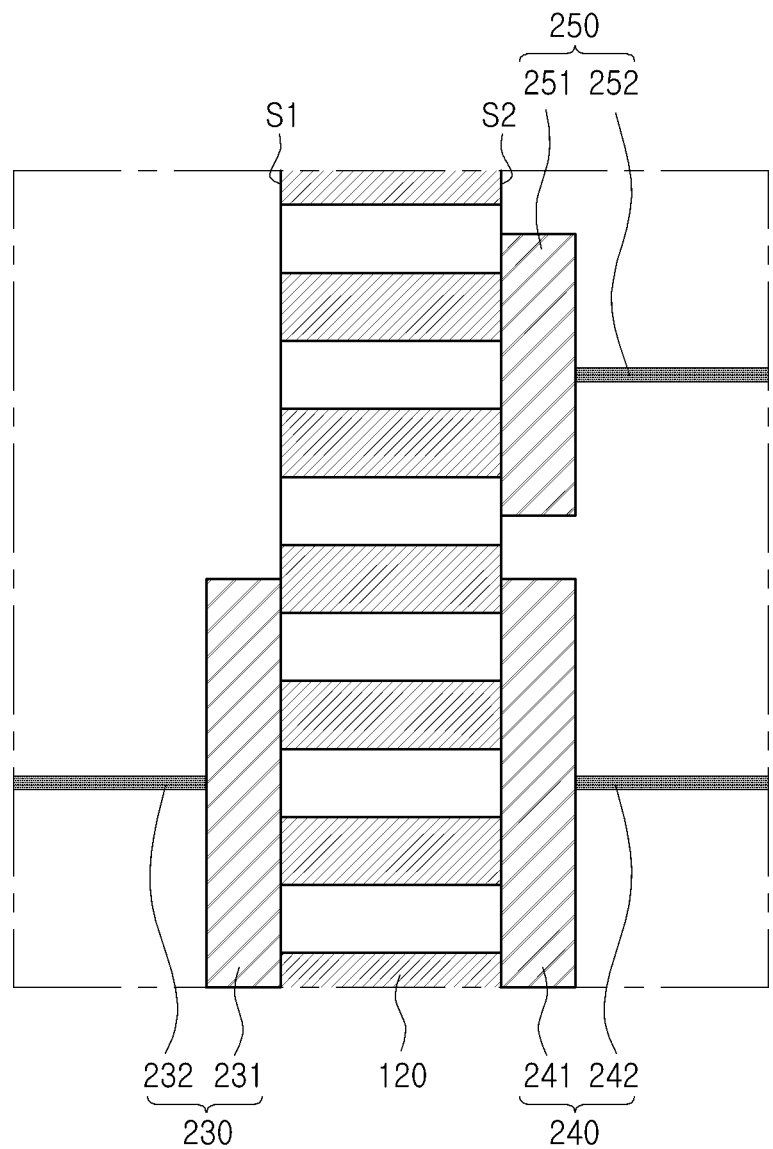
FIGS. 4 through 6 illustrate various modifications of the working electrode and counter electrode.
Figure 5:
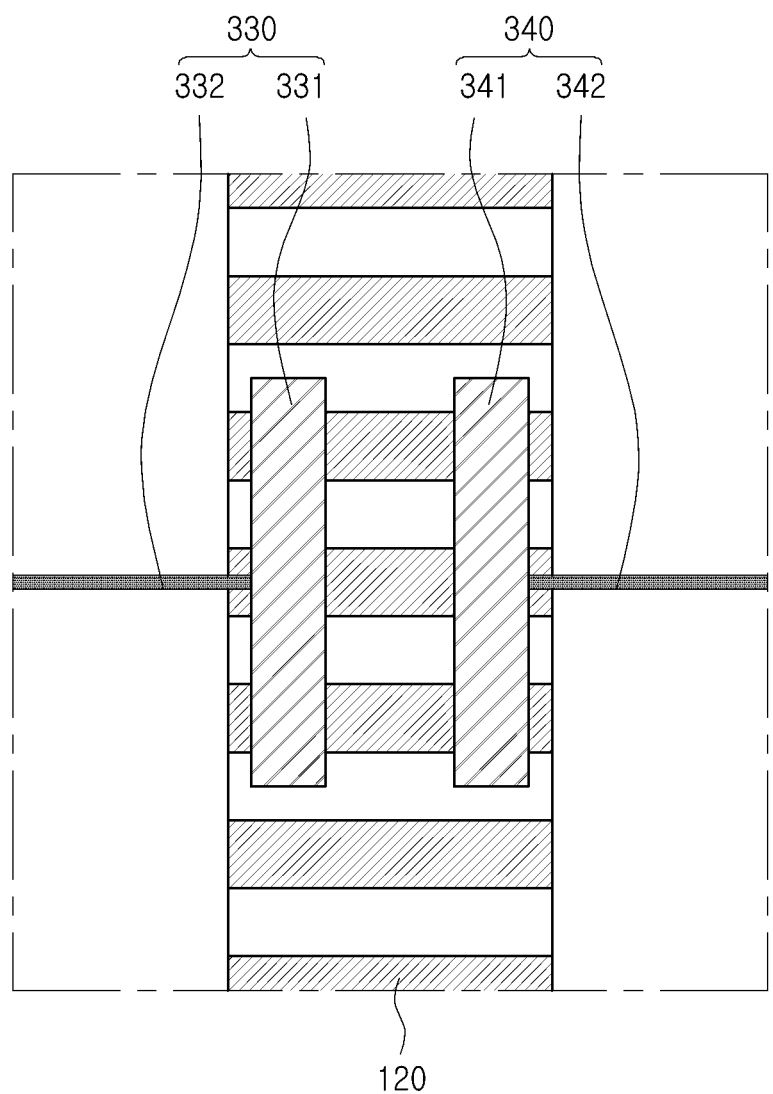
Figure 6:
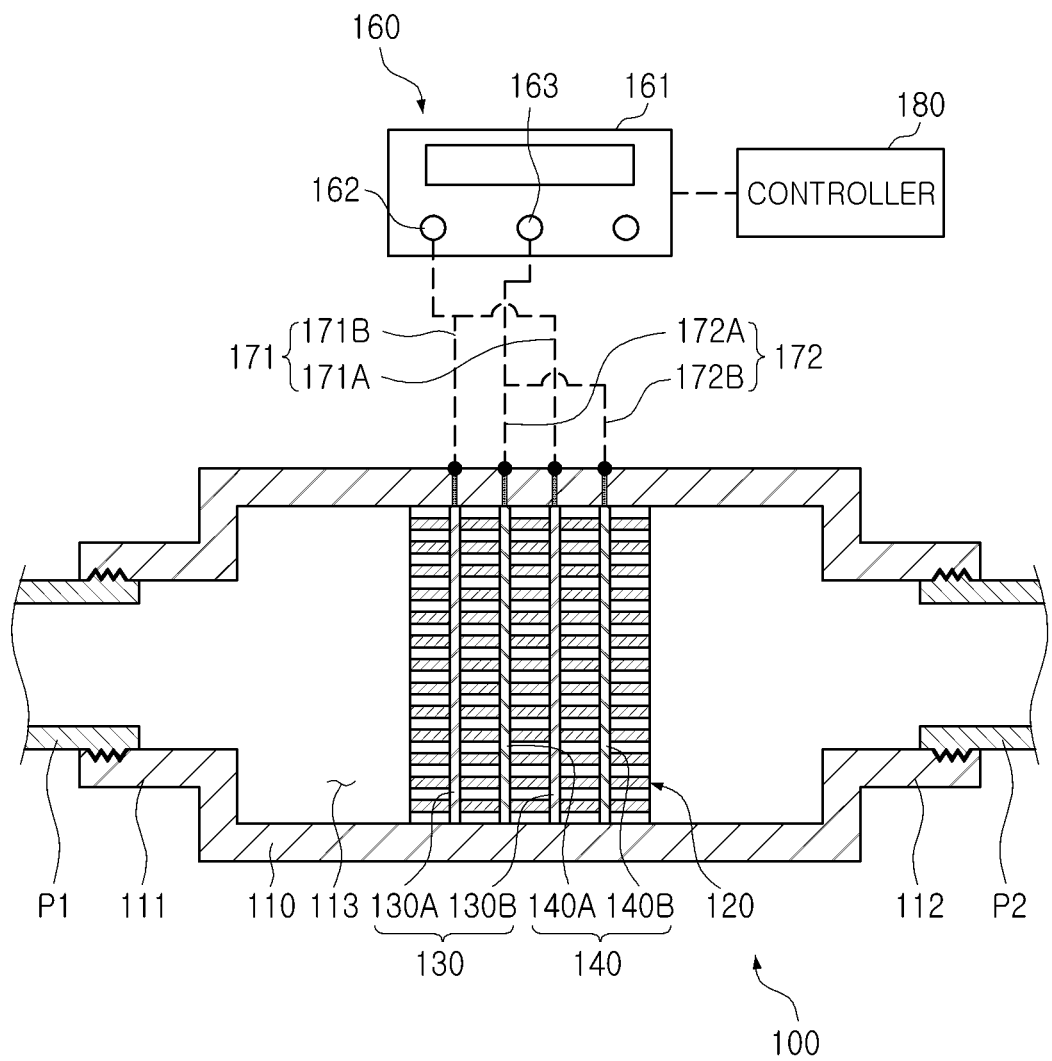

The following describes various modifications of the working electrode and counter electrode with reference to FIGS. 4 through 6. Components of the filter assembly 100 other than the working electrode and the counter electrode are at least similar to those described with reference to the example embodiment of FIG. 1, and redundant description of those components may be omitted for brevity.

The example embodiment described with reference to FIG. 4 may be different from the example embodiment described with reference to FIGS. 1 and 3 in that a working electrode 230 and a counter electrode 240 are respectively disposed to contact with the front surface S1 and the rear surface S2 of the filter 120. The working electrode 230 may include a first electrode body 231 and a first connection electrode 232, the counter electrode 240 may include a second electrode body 241 and a second connection electrode 242, and a reference electrode 250 may include a third electrode body 251 and a third connection electrode 252. The first electrode body 231 and the second electrode body 241 may respectively be disposed to contact with the front surface S1 and the rear surface S2 of the filter 120. The first electrode body 231 and the second electrode body 241 may have sizes that are similar to each other, though the present disclosure is not necessarily limited thereto. The third electrode body 251 of the reference electrode 250 may be disposed on the rear surface S2 of the filter 120 and adjacent to the second electrode body 241.

The example embodiment described with reference to FIG. 5 may include a working electrode 330 and a counter electrode 340 that are disposed inside the filter 120. The working electrode 330 may include a first electrode body 331 and a first connection electrode 332, and the counter electrode 340 may include a second electrode body 341 and a second connection electrode 342. The first electrode body 331 and the second electrode body 341 may be disposed in the filter 120, while being spaced apart from each other. The first electrode body 331 and the second electrode body 341 may have sizes that are similar to each other, though the present disclosure is not necessarily limited thereto.

The example embodiment described with reference to FIG. 6 may include a plurality of working electrodes 130 and the plurality of counter electrodes 140 that are alternately disposed within the filter 120. For example, the filter 120 of this embodiment may include several layers arranged along a longwise direction of the housing 110. The plurality of working electrodes 130 and the plurality of counter electrodes 140 may each be alternately disposed between the layers of the filter 120.

In this embodiment, the working electrodes 130 may include a first working electrode 130A and a second working electrode 130B, and the counter electrodes 140 may include a first counter electrode 140A and a second counter electrode 140B. The working electrodes 130 and the counter electrodes 140 may be alternately disposed in the filter 120, while having regular intervals therebetween. For example, the working electrodes 130 and the counter electrodes 140 may be disposed in an order of the first working electrode 130A, the first counter electrode 140A, the second working electrode 130B and then the second counter electrode 140B.

The first working electrode 130A and the second working electrode 130B may be electrically connected to the first port 162 of the potentiostat 160 by a plurality of first transmission members 171A and 171B. The first counter electrode 140A and the second counter electrode 140B may be electrically connected to the second port 163 of the potentiostat 160 by a plurality of second transmission members 172A and 172B.

Figure 9:
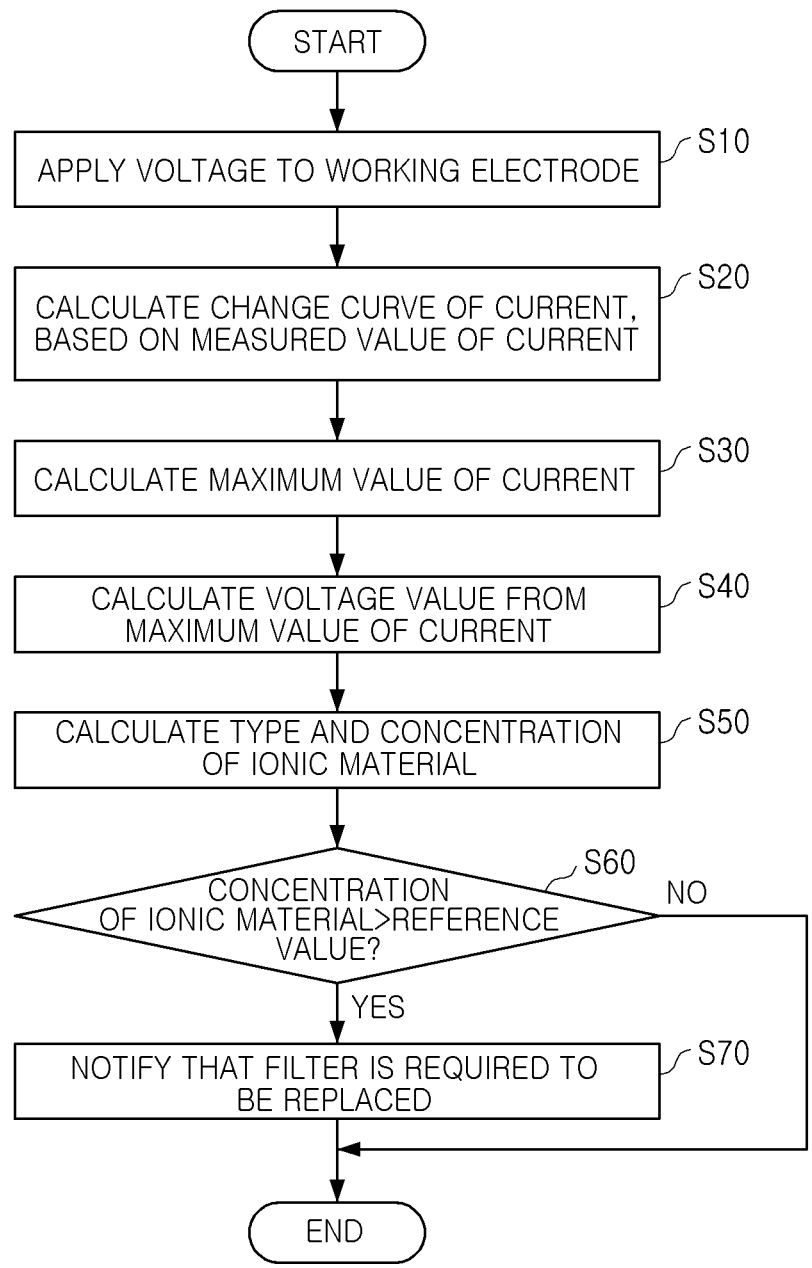
FIG. 9 is a flowchart that illustrates a filter contamination measuring method according to example embodiment of the present inventive concept.

The following describes a filter contamination measuring method according to example embodiment with reference to FIG. 9. FIG. 9 is a flowchart that illustrates a filter contamination measuring method according to example embodiment of the present inventive concept. The filter contamination measuring method of FIG. 9 is a method of measuring contamination of a filter by using the filter assembly of the previously described embodiments, and the following description will omit redundant description of the components used.

First, a voltage may be applied to the working electrode 130 (S10). The controller 180 may control the potentiostat 160 to linearly increase the voltage applied to the working electrode 130 of the filter assembly 100. The voltage may be increased during a predetermined period of time.

Next, a change curve of a current may be calculated based on a measured value of the current (S20). The controller 180 may calculate the change curve of the current, illustrating a change trend in a value of the current from the value of the current output from the working electrode 130.

Next, a maximum value of the current may be calculated (S30). The controller 180 may detect a peak in the calculated change curve of the current and calculate a value of the current at the peak. When two or more peaks are included in the change curve of the current, the controller 180 may calculate each of the values of the current, corresponding to the respective peaks, as the maximum values of the current. For example, the controller 180 may determine two or more maximum values of the current.

Next, a voltage value of the peak may be calculated from the maximum value Ip of the current (S40). The controller 180 may calculate the voltage value of the peak, corresponding to the calculated maximum value of the current. When two or more peaks are included in the change curve of the current, the controller 180 may calculate the voltage values of the two or more peaks corresponding to the respective peaks as the voltage values.

Next, the type and concentration of an ionic material may be calculated (S50). The controller 180 may calculate the type of the ionic material ION from the peak voltage value Vp based on a pre-stored correlation table which illustrates a correlation between the voltage value of the peak and the substance. In addition, the controller 180 may calculate a concentration C of the ionic material ION from the maximum value Ip of the current by using, for example, the Randles-Sevcik equation described above.

Next, it may be determined whether the concentration of the ionic material exceeds a reference value (S60). The controller 180 may determine whether to replace the filter assembly 100 by comparing the calculated concentration of the ionic material ION with the pre-stored reference value.

Next, a user or another system may be notified that the filter is required to be replaced (S70). When the filter is required to be replaced, the controller 180 may notify a user by using text, an alarm, or audiovisual members.

As set forth above, the filter contamination measuring device according to the present inventive concept may accurately measure the amount of the fine particles adsorbed on the filter.

The filter assembly which includes the filter contamination measuring device according to the present inventive concept may accurately measure the amount of the fine particles adsorbed on the filter.

The filter contamination measuring method according to the present inventive concept may accurately measure the amount of the fine particles adsorbed on the filter in real time. For example, the method described herein may measure an amount of contaminant material adsorbed on the filter in response to a signal or operation of the controller described above.

While example embodiments have been shown and described above, it will be apparent to those skilled in the art that modifications and variations could be made without departing from the scope of the present inventive concept as defined by the appended claims.

What is claimed is:

1. A filter contamination measuring device comprising:
a working electrode disposed adjacent to a first surface of a filter, the filter configured to adsorb an ionic material of a first polarity;
a counter electrode disposed adjacent to a second surface of the filter, the second surface opposite to the first surface;
a potentiostat configured to apply a voltage of a second polarity, that is opposite to the first polarity, to the working electrode for a predetermined period of time, and to measure current output from the working electrode during the predetermined period of time; and
a controller configured to:
calculate a maximum value of the current obtained during the predetermined period of time based on current measured by the potentiostat,
calculate a value of the voltage applied by the potentiostat at the maximum value of the current,
calculate the type and concentration of the ionic material from the voltage value, and
compare the type and concentration of the ionic material with a reference value to determine whether the filter is contaminated,
wherein the potentiostat is configured to linearly increase the voltage applied to the working electrode during the predetermined period of time.

2. The filter contamination measuring device of claim 1, wherein the controller calculates a change curve of the current based on the current measured by the potentiostat, and calculates the maximum value of the current and the voltage value from the change curve of the current.

3. The filter contamination measuring device of claim 1, wherein the working electrode is spaced apart from the first surface of the filter, and wherein the counter electrode is spaced apart from the second surface of the filter.

4. The filter contamination measuring device of claim 1, wherein the working electrode contacts the first surface of the filter, and wherein the counter electrode contacts the second surface of the filter.

5. The filter contamination measuring device of claim 1, further comprising a reference electrode disposed adjacent to the counter electrode and connected to the potentiostat.

6. The filter contamination measuring device of claim 5, wherein the working electrode and the counter electrode are made of a first material, and
wherein the reference electrode is made of a second material different from the first material.

7. The filter contamination measuring device of claim 1, wherein the filter is a membrane filter.

8. A filter assembly comprising:
a housing having an inlet through which a fluid containing an ionic material of a first polarity is introduced and an outlet through which the fluid is discharged;
a filter installed between the inlet and the outlet in the housing configured to remove the ionic material;
a working electrode and a counter electrode respectively disposed on the front surface and rear surface of the filter;
a potentiostat configured to apply a voltage of a second polarity, opposite to the first polarity, to the working electrode, and to measure current output from the working electrode over a predetermined period of time; and
a controller configured to:
calculate a maximum value of the current obtained during the predetermined period of time, based on the current measured by the potentiostat,
calculate a value of the voltage applied by the potentiostat at a point in time corresponding to the maximum value of the current,
calculate the type and concentration of the ionic material from the voltage value, and
compare the type and concentration of the ionic material with one or more reference values to determine whether the filter is contaminated,
wherein the potentiostat is configured to increase the voltage applied to the working electrode for the predetermined period of time.

9. The filter assembly of claim 8, wherein the working electrode includes a first electrode body and a first connection, the first connection electrically connecting the first electrode body to the housing, and
wherein the counter electrode includes a second electrode body and a second connection, the second connection electrically connecting the second electrode body to the housing.

10. The filter assembly of claim 9, wherein the first electrode body and the second electrode body have similar sizes.

11. The filter assembly of claim 9, wherein the first electrode body and the second electrode body are made of the same material as each other.

12. The filter assembly of claim 9, wherein the first electrode body contacts the front surface of the filter, and wherein the second electrode body contacts the rear surface of the filter.

13. The filter assembly of claim 12, further comprising a reference electrode disposed adjacent to the counter electrode and connected to the potentiostat.

14. The filter assembly of claim 8, wherein the filter comprises a plurality of filter layers arranged along a longwise direction of the housing, the working electrode comprises a plurality of working electrodes, and the counter electrode comprises a plurality of counter electrodes, and
wherein working electrodes of the plurality of working electrodes are disposed alternately with counter electrodes of the plurality of counter electrodes within gaps between filter layers of the plurality of filter layers.

15. A filter contamination measuring method comprising:
applying a voltage of a second polarity, opposite to a first polarity, to a working electrode disposed adjacent to a first surface of a filter, wherein the filter is configured to adsorb an ionic material of the first polarity;
increasing the voltage over a predetermined amount of time using a potentiostat, and measuring a resultant current output from the working electrode;

calculating a change curve of the current, which includes values of the current arranged over time;

detecting a peak in the change curve of the current, and calculating a maximum value of the current at the peak;

calculating a value of the voltage applied by the potentiostat at the detected maximum value of the current;

calculating a type of the ionic material adsorbed on the filter from the voltage value, and calculating a concentration of the ionic material adsorbed on the filter from the maximum value of the current; and comparing the calculated concentration of the ionic material with one or more pre-stored reference values to determine whether the filter is contaminated.

16. The filter contamination measuring method of claim 15, wherein the voltage of the second polarity is within a range of a first voltage to a second voltage, and includes an oxidation voltage value or a reduction voltage value of the ionic material.

17. The filter contamination measuring method of claim 15, wherein the calculating of the type of the ionic material further includes comparing the voltage value with an oxidation voltage value or a reduction voltage value of the ionic material.

18. The filter contamination measuring method of claim 15, wherein the filter is a membrane filter, and wherein the ionic material is adsorbed on a pore of the membrane filter.

19. The filter contamination measuring method of claim 18, wherein the ionic material adsorbed on the pore is detached from the filter when the voltage of the second polarity is applied to the membrane filter.

20. The filter contamination measuring method of claim 15, wherein the ionic material includes a positive ion, and wherein the voltage of the second polarity is a negative voltage.

* * * * *